US006822653B2

(12) United States Patent
Boyd et al.

(10) Patent No.: US 6,822,653 B2
(45) Date of Patent: Nov. 23, 2004

(54) METHODS AND SYSTEM FOR GENERAL SKINNING VIA HARDWARE ACCELERATORS

(75) Inventors: Charles N. Boyd, Woodinville, WA (US); David John Martin, Redmond, WA (US); Anuj B. Gosalia, Bellevue, WA (US); David Floyd Aronson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 10/186,989

(22) Filed: Jun. 28, 2002

(65) Prior Publication Data

US 2004/0001064 A1 Jan. 1, 2004

(51) Int. Cl.[7] .............................................. G06T 15/00
(52) U.S. Cl. ..................................................... 345/474
(58) Field of Search ................................ 345/419, 619, 345/473, 474, 475

(56) References Cited

U.S. PATENT DOCUMENTS

| | | | | |
|---|---|---|---|---|
| 5,680,531 A | * | 10/1997 | Litwinowicz et al. | 345/473 |
| 5,692,117 A | * | 11/1997 | Berend et al. | 345/475 |
| 6,535,215 B1 | * | 3/2003 | DeWitt et al. | 345/473 |
| 6,700,586 B1 | * | 3/2004 | Demers | 345/588 |

OTHER PUBLICATIONS

Arad N. et al., "Image Warping by Radial Basis Functions: Applications to Facial Expressions," *Computer Vision, Graphics, and Image Processing*, 1994, 56(2), 161–172.

Aydin, Y. et al., "Database Guided Computer Animation of Human Grasping Using Forward and Inverse Kinematics," *Computers & Graphics*, 1999, 23(1), 145–154.

Hohmeyer, M.E., "Skinning Rational B–Spline Curves to Construct an Interpolatory Surface," *CVGIP–Graphical Models and Image Processing*, 1991, 56(6), 511–521.

Marsan, A.L. et al., "Computational Techniques for Automatically Tiling and Skinning Branched Objects," *Computer Graphics*, 1999, 23(1), 111–126.

Micchelli C.A., "Interpolation of Scattered Data: Distance Matrices and Conditionlly Positive Definite Functions," *Constr. Approx.*, 1986, 2,11–12.

Millar, R.J. et al., "A Review of Behavioural Animation," *Computers Graphics*, 1999, 23(1), 127–143.

Powell, M.J.D., "Radial Basis Functions for Multivariable Interpolation: A Review," *Algorithms for Approximation*, Mason, J.C. et al. (eds.), Oxford University Press, Oxford UK, 1987, 143–167.

Rose, C. et al, "Verbs and Adverbs: Multidimensional Motion Interpolation," *IEEE Computer Graphics And Applications*, 1998, 18(2), 32–40.

Ruprecht. D. et al., "Image Warping With Scattered Data Interpolation," *IEEE Computer Graphics and Applications*, 1995, 15(5), 37–43.

Tokuyama, Y., "Skinning–Surface Generation Based on Spine–Curve Control," *Visual Computer*, 2000, 16(2), 134–140.

Turk, G. et al., "Shape Transformation Using Variational Implicit Functions," *Computer Graphics*, 1999, 335–342.

* cited by examiner

*Primary Examiner*—Phu K. Nguyen
(74) *Attorney, Agent, or Firm*—Woodcock Washburn LLP (57) ABSTRACT

Complex computer graphics forms and motions can be constructed either by hand or with motion or geometry capture technologies, once they are created, they are difficult to modify, particularly at runtime. Interpolation provides a way to leverage artist-generated source material. Methodologies for efficient runtime interpolation between multiple forms or multiple motion segments enables computers to perform more realistic animation in real-time. Shape interpolation is applied to predefined figures to create smoothly skinned figures that deform in natural ways. Predefined figures are selected using a search technique that reduces the amount of interpolation required to produce real-time animation.

60 Claims, 8 Drawing Sheets

METHODS AND SYSTEM FOR GENERAL SKINNING VIA HARDWARE ACCELERATORS

FIELD OF THE INVENTION

The present invention relates to systems and methods for efficiently modifying the shape of geometries in a smooth continuous manner.

BACKGROUND OF THE INVENTION

Modern animation and modeling systems enable artists to create high-quality content, but provide limited support for interactive applications. Although complex forms and motions can be constructed either by hand or with motion or geometry capture technologies, once they are created, they are difficult to render, particularly at runtime.

At this time, a variety of 3D scanning methodologies are available that can capture shapes that exist in the real world. Motion capture technologies are also capable of recording complex performances. Capture devices are restricted to recording shapes and motions that can be observed and that actually exist (e.g., such systems cannot capture the motion of a dinosaur). In contrast to the scanning devices, highly skilled artists have the advantage of being able to model complex existing shapes, as well as imaginary shapes and animations.

Since the 1980s 3D graphics hardware accelerators were focused on CAD requirements. CAD requirements implied rigid bodies, i.e., shapes that are most often modified by a single transformation matrix. As computers became more powerful, developers began to use computers to mimic moving characters such as robots. Making the leap from CAD to moving robots was conceptually simplistic; moving parts were separately modeled as rigid bodies that were connected to each other by seams at all moving joints. As the demand for more animated and lifelike characters increased, hardware accelerators evolved that added native support to computer systems for rendering non-rigid objects. This in turn, raised the quality bar for character rendering. However, the hardware support has lacked the ability to attain the level supported by software skinning techniques available in authoring tools used to create content for non-real-time media such as movies. Examples of such skinning techniques include terms such as "smart-skin," "FFD's," "wraps," expressions, and so on.

Artists want to use these techniques to create characters that can be efficiently rendered on 3-D hardware accelerators. Yet while there are a large number of such techniques, most of them make assumptions about running on a general purpose CPU that does not translate into efficient operation on a streaming DSP or Graphics Processor Unit (GPU).

SUMMARY OF THE INVENTION

The invention provides systems and methods for generating a computer graphic of a shape to be animated. The shape has at least one joint wherein the shape changes about the joint, such as would occur in a simulation of an arm bending about an elbow. The system and method comprise providing a mesh of at least three points, where each point is defined in three-dimensional space. The mesh is indicative of the shape in a base position. Additionally, information is provided that is indicative of the position of the points in the mesh corresponding to the shape at predefined positions wherein the shape has changed about the joint, e.g. the arm at different bend positions, with respect to the base position. A changed position of the shape is generated from the position of the points in the mesh by interpolating between the information indicative of the position of the points in the mesh corresponding to the shape at selected predefined positions. The selected positions are identified as the closest positions in parameter space to a desired or approximated position. Preferably, the predefined positions are selected using a search of joint parameters. Other features and embodiments of the present invention are described below.

BRIEF DESCRIPTION OF THE DRAWINGS

The system and methods for managing the computational resources of graphics processor(s) are further described with reference to the accompanying drawings in which.

DETAILED DESCRIPTION OF THE INVENTION

Overview

Modern animation and modeling systems enable artists to create high-quality content, but provide limited support for interactive applications. Although complex forms and motions can be constructed either by hand or with motion or geometry capture technologies, once they are created, they are difficult to modify, particularly at runtime.

Interpolation or blending provides a way to leverage artist-generated source material to provide realistic interactive animation. Presented here are methodologies for efficient runtime interpolation between multiple forms or multiple motion segments. Once the illustrated and described system is provided with example forms and motions, it generates a continuous range of forms referred to as a "shape" or a continuous range of motions.

Additionally, shape interpolation methodology is applied to articulated figures to create smoothly skinned figures that deform in natural ways. The runtime interpolation of the forms or motions runs fast enough to be used in interactive applications such as games.

Exemplary Computing Device

Figure 1:
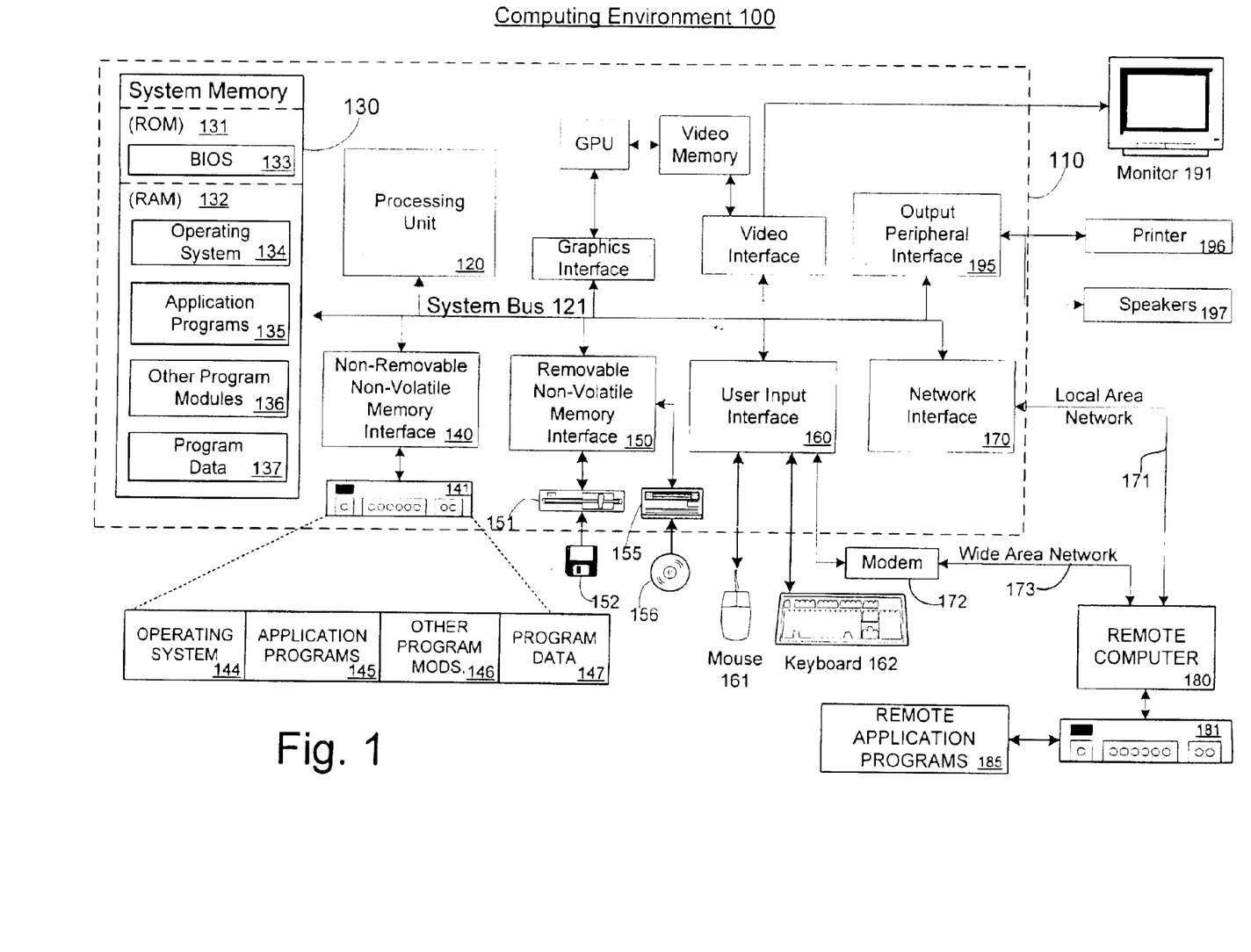
FIG. 1 is a block diagram of an exemplary computer system that is suitable for use with the described embodiments.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example. Those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. Processing unit 120 may comprises one or more processors. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for AGP communications. One or more graphics processing units (GPUs) 184 may communicate with graphics interface 182. In this regard, GPUs 184 generally include on-chip memory storage, such as register storage and GPUs 184 communicate with a video memory 186. The invention may be described more generally in connection with any coprocessor, of which GPUs 184 are but one example. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example System

Figure 2:
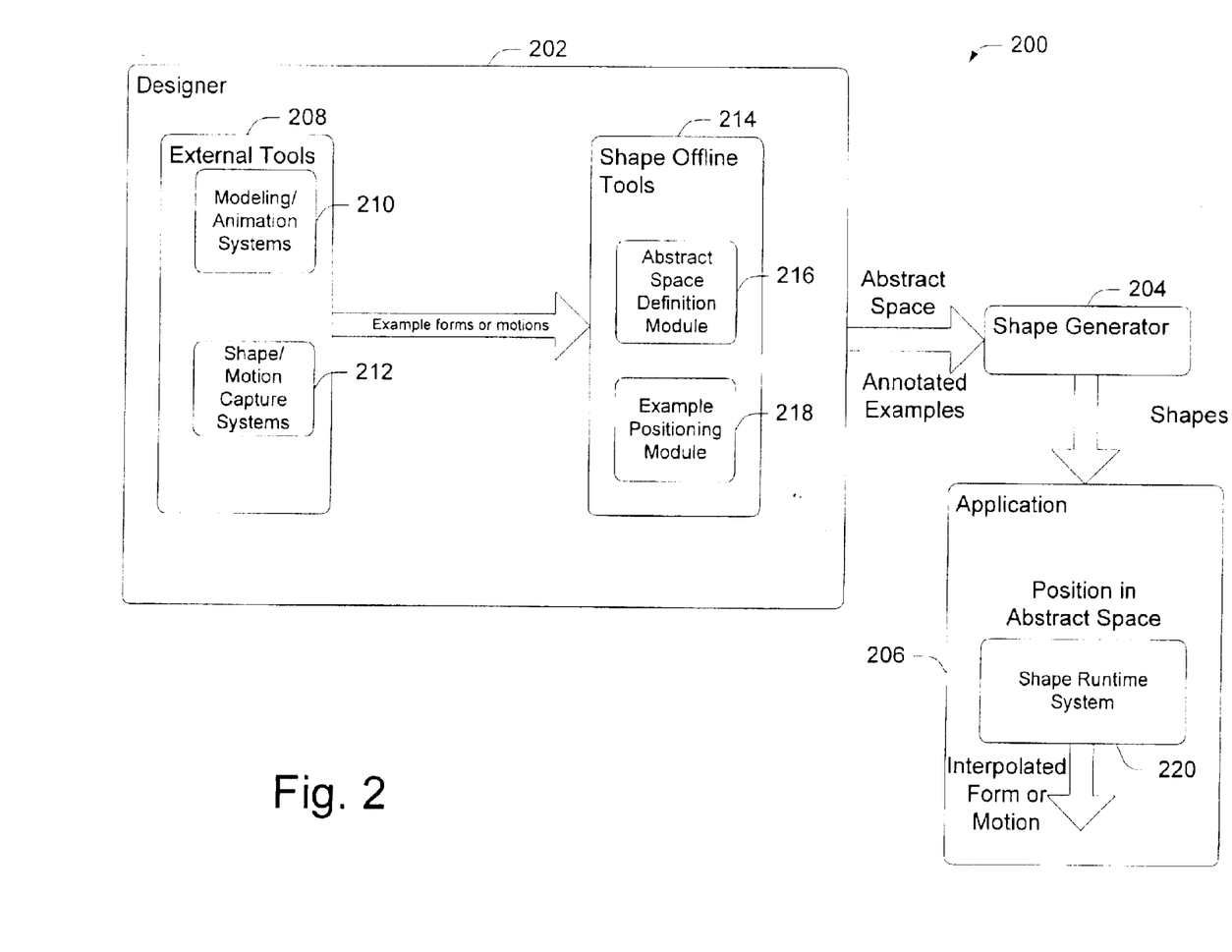
FIG. 2 is a block diagram of an exemplary system in which the inventive methodologies can be employed.

FIG. 2 shows an exemplary system 200 in which the methodologies discussed below can be employed. In the discussion immediately below, the system's components are first identified followed by a discussion of their functionality.

System Components

In the illustrated example, system 200 comprises a designer component 202, a shape generator 204, and an exemplary application 206. One primary focus of system 200 is to provide a way, in an application, to have a very lightweight, fast runtime system that allows for modification of a shape or animation on the fly in the context of the application (which can typically comprise a game).

Designer component 202 comprises an external tools module that can include, among other components, modeling/animation systems 210 and shape/motion capture systems 212. The designer component also comprises various shape offline tools 214 that comprise an abstract space definition module 216 and an example position module 218 that positions examples in abstract space.

Application 206 comprises a shape runtime system 220 that is embedded in an application, such as a game, that uses the system described below to drive the animation of a character.

System Component Functionality

Typically, a designer relies on external modeling and animation systems and/or geometry and motion capture technology (external tools 208 ) to create initial or base forms and motions. Additionally, from the base form, other positions of the shape can be modeled that represent movement from the base shape. As an illustration, consider an object that has a shape. One way of capturing the object's shape might be to project structured light onto the object so that a camera and computer can record the object's shape. This shape is digitized and can then be used in graphics applications. For a situation that involves motion, a person might be outfitted with a number of reflectors and then filmed so that a computer can capture their motion. In each of the these systems, once the images are captured they are very difficult to modify. In a traditional system, these captured images from externals tools 208 would flow directly to an application that would simply pull out the captured images and run them as appropriate in known ways.

In the illustrated and described embodiment, offline tools 214 enable the designer to organize these example forms or motions that serve as input into shape generator 204. To do so, the designer can choose a set of adjectives that characterize the forms or a set of adverbs that characterize the motions. The adjectives or adverbs define an abstract space and each adjective or adverb represents a separate axis in this abstract space. For instance, adjectives that describe the form of a human arm may include gender, age, and elbow bend. These adjectives are used to define the axes in an abstract space.

In accordance with the present embodiment, an example authoring process would follow steps such as:

1. Create character using boned skinning method
2. For each joint
   For each desired pose
     adjust shape using any technique
     save keypose/snapshot
     get next pose
     do next joint (This order of operations is just an example and is not required but each desired key pose should be saved.)

After the authoring process is complete, then for each joint for each pose:

1. deform model using base skinning technique selected for this hw
2. extract differences from this result to the actual authored model
3. save them with corresponding pose-space parameters (joint angles).

Figure 3:
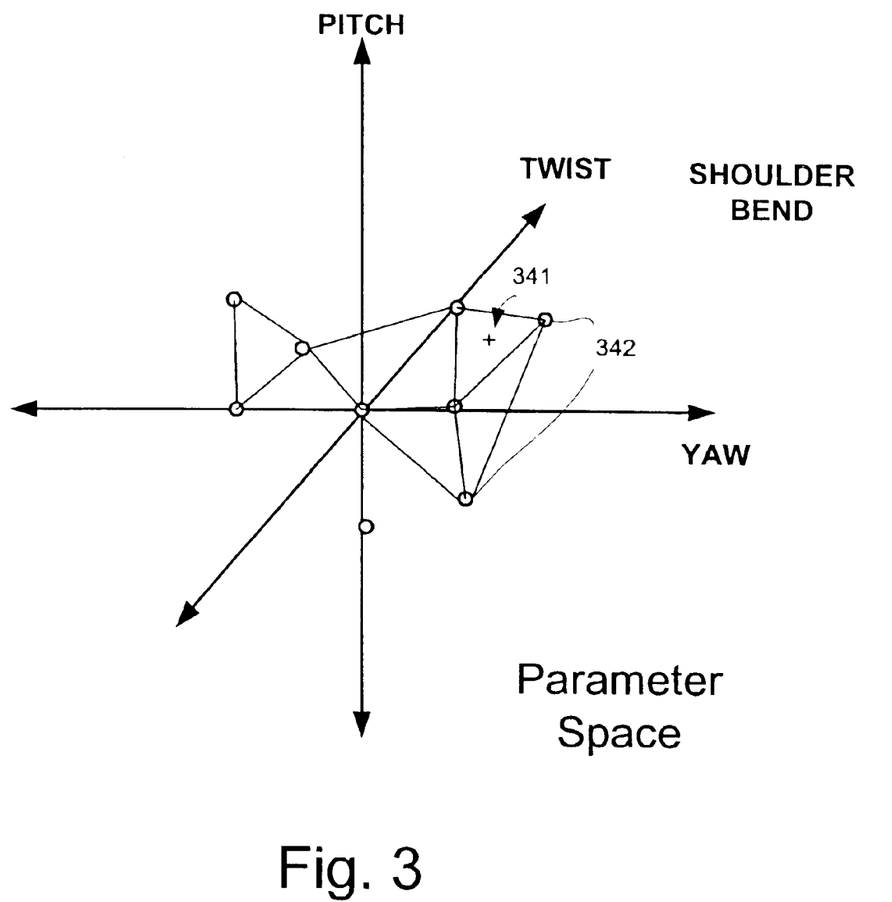
FIG. 3 is a diagram that illustrates an exemplary abstract space and is useful in understanding some of the concepts behind the inventive embodiments.

Once the designer has defined various poses, e.g., using offline tools 214 (FIG. 2), each joint's motion is annotated with its location in parameter space that defines its location relative to degrees of freedom for that joint. FIG. 3 further illustrates the parameter space or pose space for a joint. There, each axis describes a degree of freedom in parameter space. The vector "shoulder bend" can range over the parameter space depending on the movement of shoulder i.e. the particular yaw, pitch and twist. According to an aspect of the invention, for a given generated joint movement in parameter space, the closest predefined joint parameters (342) to a point (341) on the skin ars selected. In the example, of FIG. 3 three predefined joint parameters are selected based on the number of degrees of freedom of the joint. The parameters are prefereably maintained in a Delaunay triangulation which can be searched to use in interpolating corrections to apply as described more fully below.

Based on the annotated examples and the abstract space, shape generator 204 solves for the coefficients of a smoothly-varying interpolation of the forms and motions across the abstract space. These coefficients provide the means to interpolate between the example forms and motions at runtime. In the context of this document, the output produced by the shape generator 204 is referred to as a "shape" when interpolating forms.

At runtime, application 206 chooses, at each moment in time, desired values for the adjectives or adverbs, thus defining a specific location in the abstract space. For instance, a character can be set to be happy or sad or anywhere in between; an arm can be specified to be more male or female, or to respond to the bending of the elbow. The shape and verb runtime system 220 then responds to the selected location in the abstract space by efficiently blending the annotated examples to produce an interpolated form or motion.

Consider that a shape is a collection of numbers that numerically describe the degrees of freedom (DOFs). For instance, a shape is composed of many vertices and triangles. Each vertex i can be considered as three numbers (x, y, z) and there may be a few hundred vertices that describe a shape. Typically, there may be a few thousand numbers that are associated with each example and that describes the example. With respect to motion, such is analogously described by a collection of numbers that might define, for example, the motion of an arm during a defined period of time.

Shape Generation

Figure 4:
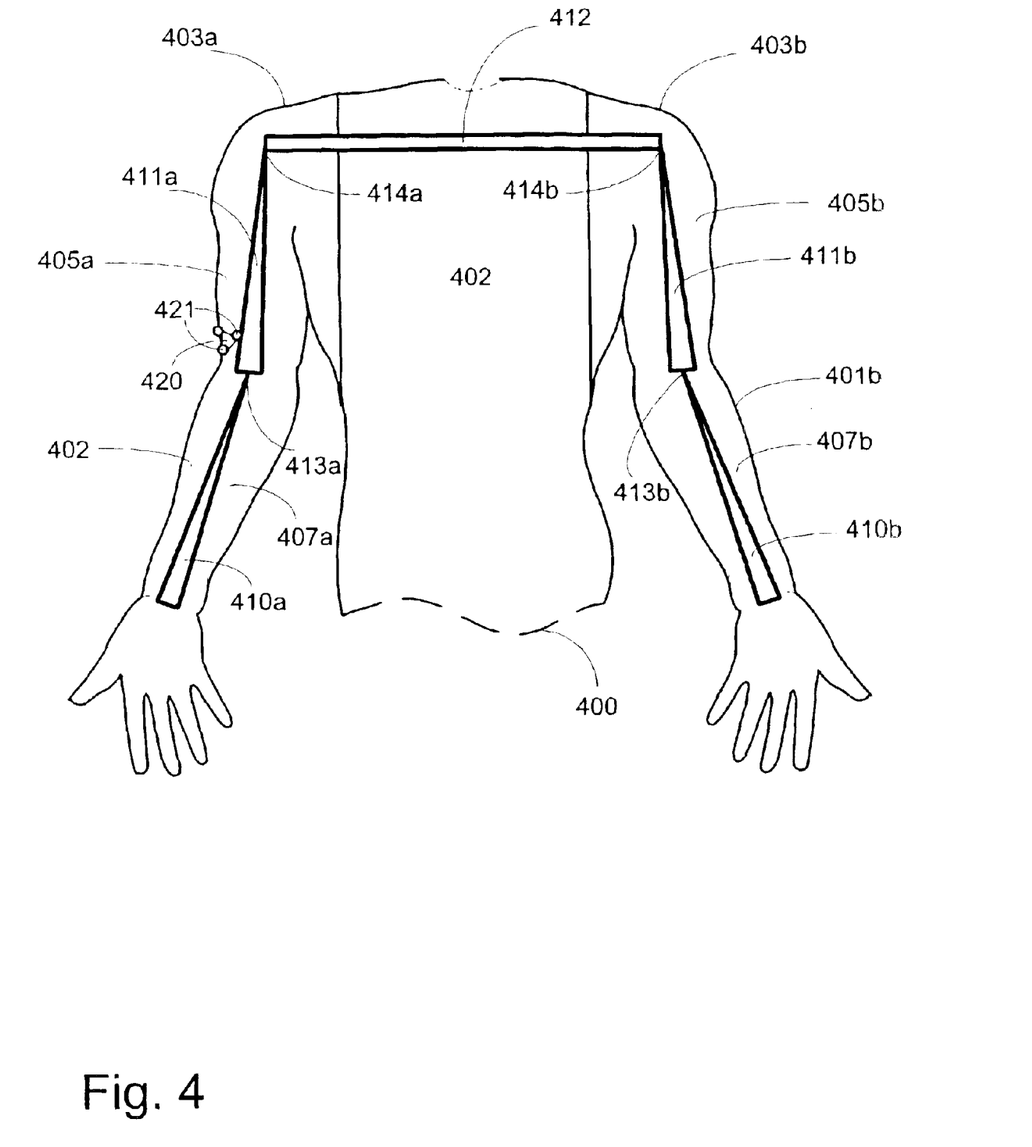
FIG. 4 is an illustration of a portion of a character having a frame, joints, and an out skin formed by a mesh.

Given a set of shapes, the challenge is to ascertain mathematically how a shape should look during motion. This includes shapes that were not predefined by a designer. FIG. 4 provides an illustration that demonstrates the methodologies described herein. FIG. 4 is a portion (torso) 400 of an illustrative computer-generated character. The shape of the character is described by an artist in accordance with a technique like the techniques described above. The shape is then represented by the computer as a skin surface over a skeleton or frame. The skin surface is represented as a mesh of polygons, such as polygon 420. Each polygon has vertices. In this example, the triangular polygon has three vertices 421. The shape of the particular character in this illustration comprises two limbs 401a, 401b that are attached to a main body 402 at shoulder 403a, 403b, respectively. Each limb has an upper segment 405a, 405b and a lower segment 407a, 407b and has the capability to visually simulate movement. This simulated movement is aided by a conceptual frame (e.g., skeleton). Here, the frame comprises frame segments 410a, 411a, 412, 411b, 410b. The frame segments are joined at joints 413a, 413b, 414a, 414b. The simulated movement occurs primarily about the joints, e.g., 413a, 413b, 414a, 414b. For example, lower segment 407b could virtually bend with respect to upper segment 405b about joint 413b.

Figure 5A:
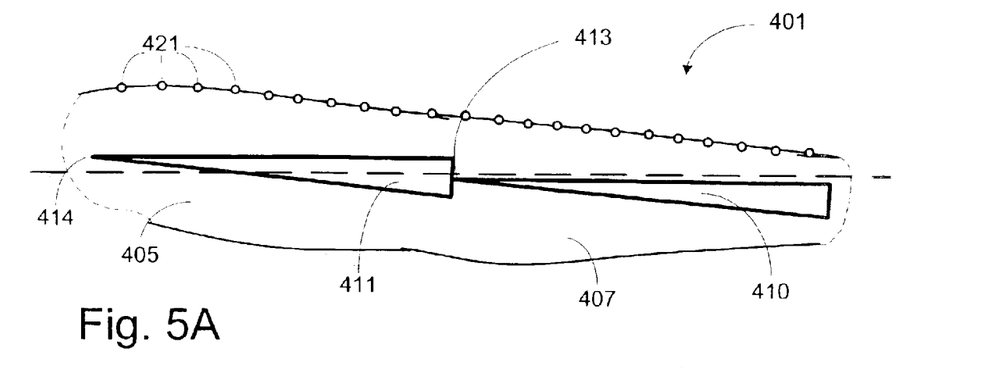
FIGS. 5A–5C illustrate the process of mathematically approximating the movement of a shape about a joint area.
Figure 5B:
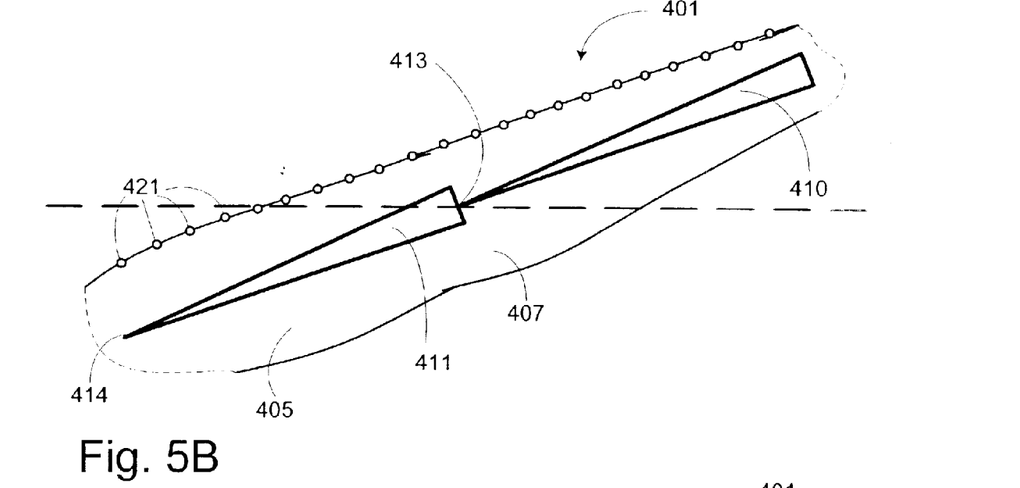
Figure 5C:
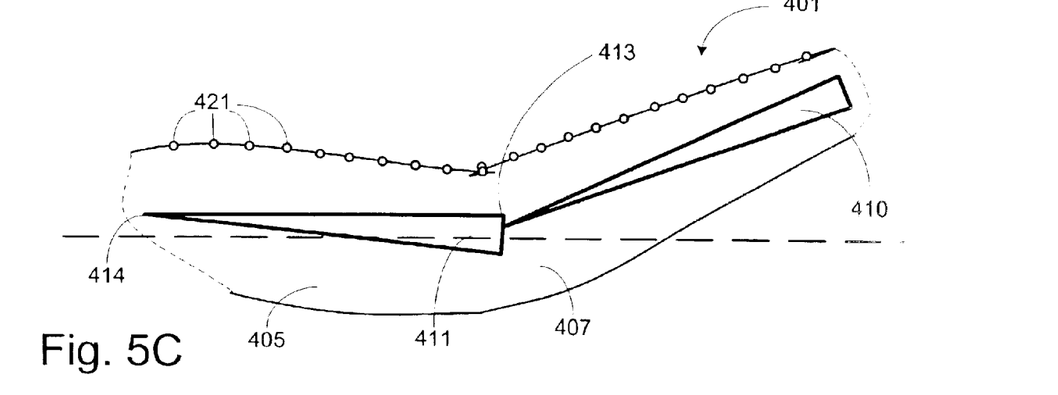

FIGS. 5A–5C illustrates the methodology employed to simulate movement of the shape about the joints. In the illustration, the movement of a limb 401 is used to illustrate the general principles of movement of shapes about joints. Here, limb 401 comprises an upper segment 405 (e.g., a bicep) and a lower portion 407 (e.g., a forearm). Each of segments 405, 407 have a corresponding frame segment 410, 411 about which the mesh of points 421 is wrapped to form virtual skin surface. The frame segments 410, 411 are joined at joint 413. A change in this portion 401 of the shape (e.g., 400) would be simulated as follows: The entire limb 401 on both sides of joint 413 are mathematically transformed, once for each segment 405, 407; and the two segments 405, 407 are blended together to produce the changed shape of limb 401. For example, FIG. 5A illustrates how limb 401 is transformed for motion by the upper segment 405. FIG. 5B illustrates how the limb is transform ed for motion by the lower segment 407. FIG. 5C illustrates how the transformed upper segment 405 and the transformed lower segment 407 are blended together to mathematically approximate the movement of limb 401 about joint 413. Note that the limb may have also experienced movement about joint 414. A similar process would apply to that joint movement.

Figure 5D:
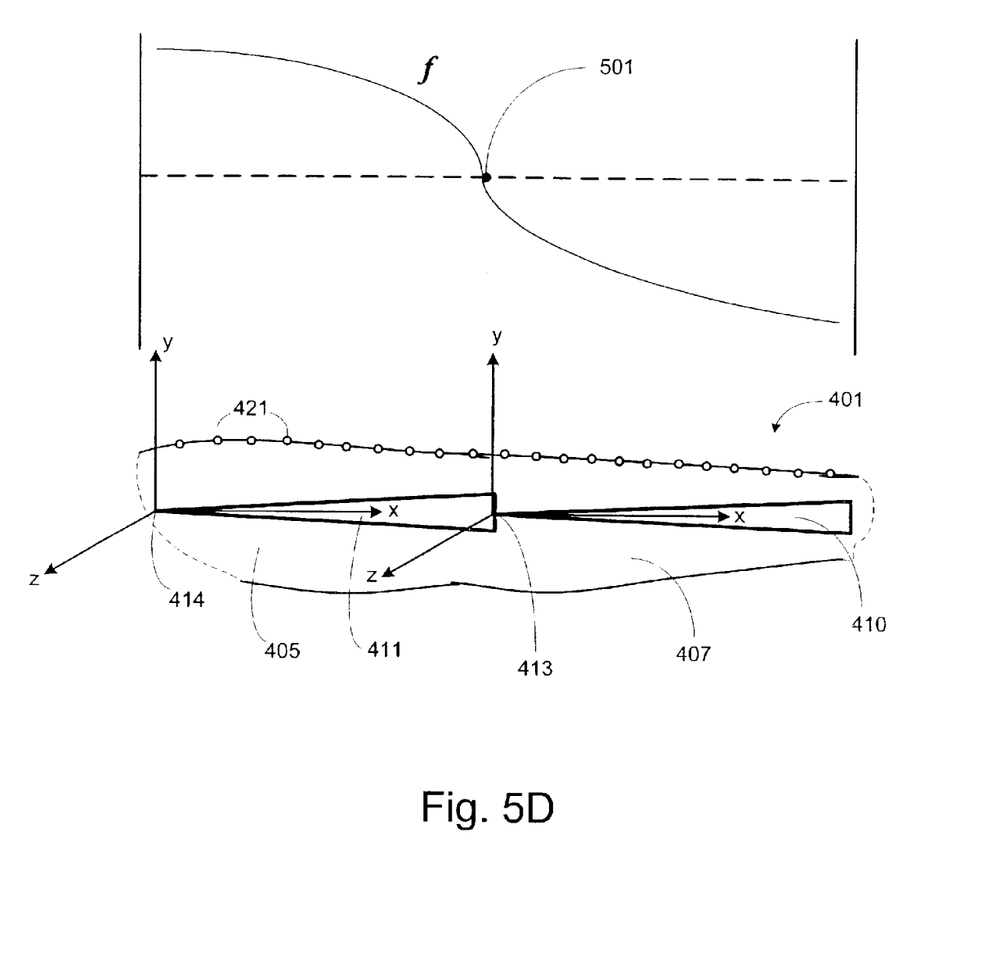
FIG. 5D illustrates the process of blending the area of the mesh about a joint portion of a shape.

FIG. 5D further illustrates the method for blending the upper segment and lower segment together about the joint section of the limb. In essence, the entire limb 401 is represented by frame segments 410, 41 and an outer skin that is represented by a mesh comprising a plurality of points 421. Each point has three dimensions (x, y, and z). The limb 401 is transformed by applying a transform function to each frame segment 410, 411 (i.e., moving the frame segments in x, y, z space). For example, movement to the frame segments may be applied to indicate the relative position of the shape. The movement to the frame segments must then be applied to the outer skin (i.e., the mesh) to create the illusion of realistic movement of a skinned body. The movement of frame segments 410, 411 is generally applied to each point in the mesh to move it to a proper position in space.

The process is straightforward for points further away from joint sections. However, in areas proximate the joint section, the behavior of outer skins is generally much more complex than the movement of the frame segments (e.g., to represent muscle bulges and the like). In particular the outer skin in the joint area is be influence by both the movement of both frame segments (and even the movement of other frame segments, e.g., about joint 414). Accordingly, as illustrated in FIG. 5D, a function F is applied to each point 421 in the mesh to determine the amount of influence that a mesh point 421 experiences from each frame section. Note for example, in the area 501 right at the joint, mesh points are equally influenced by both frame segments 410, 411.

FIG. 5D illustrates how a mathematical approximation can be made of a shape to create virtual motion. However, the visual perception of joint sections (e.g., the skin around the joint 413) can be further enhanced by applying artist corrections to the shape in the area of a joint that has undergone a change. After the first mathematical approximation is made, the skin in the area proximate the joint may not provide the best visual realism. For example, points 421 in the mesh may experience discontinuities that do not accurately mimic realistic motion. To enhance the realism, artist correction data may be blended in the joint area to correct the look of the joint.

Figure 6:
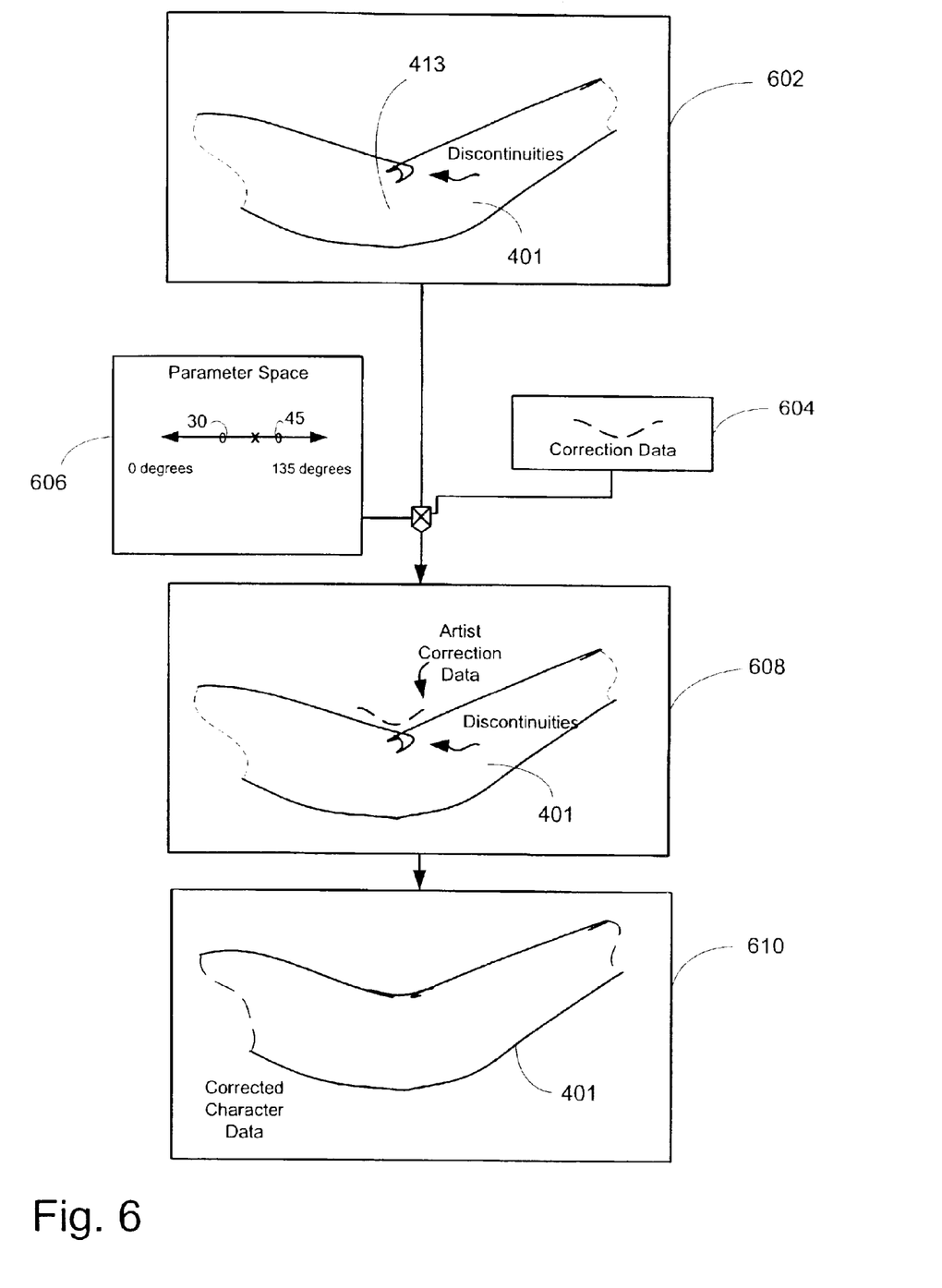
FIG. 6 illustrates the process of adjusting or correcting a shape with artist corrections in the area of a joint after a mathematical approximation of a movement about a joint.

FIG. 6 is a flow diagram that describes steps in a method in accordance with the described embodiment. The method can be implemented in any suitable hardware, software, firmware, or combination thereof. After making the mathematical approximation of the shape of the outer skin as described above, the mesh may experience errors that detract from the visual approximation of a realistic shape. For example, as shown in 602, limb 401 has experience discontinuities proximate joint 413. Accordingly, correction data 604 is applied to the joint area with a correction factor 606 that is a blend of data points obtained from a search of parameter space. The correction data is predefined data that has preferably been generated by an artist or in accordance with the techniques describe in connection with FIG. 2.

However, only a portion of the artist generated data proximate a joint area need be applied. So for example, correction data may exist for a joint bend of 45 degrees and correction data may exist for a joint bend of 30 degrees. Thereafter, a search is made for the most appropriate correction data to apply to the joint area and that correction data is blended with the joint to smooth out the visual effect to provide more realism. Notably, more than one set of correction data may be applied and blended into the joint area. Here the search determines that the correction is a blend from between the 30 and 45 degree points.

Selecting Corrections

In the illustrated example, a specific shape of the individual basis functions is selected. The joint parameters are used to identify which are the nearest key poses in joint parameter space via a spatial search. The corrections shown in FIG. 5 were illustrated in two dimension. In practice, the space that is searched for corrections comprises a set of meshes in three dimensional space. Hence, to make the search for the corrections to apply more efficient a spatial search is applied by comparing the approximated joint parameters to the set of correction joint parameters (i.e., joint correction meshes).

The corrections are then interpolated to the values at the actual current joint parameters, and then added onto the base skinning mesh computed by the real-time hardware technique. In this technique the total amount of data that must be sent to the hardware accelerator (e.g., the GPU) is minimized. The data sent comprises:

- The base dataset required for conventional hardware skinning, plus
- A number of correction datasets equal to joint space dimension+1

Further, these corrections being small can often use lower-precision representations such assigned byte or signed shorts. In the present example of a character elbow joint, the parameter space is 2-D up-down versus left-right (i.e. there are 2 joint angles). Poses snapshoted in this space cover a 2-D surface. This can be searched on the host CPU to identify the closest points to use in interpolating the corrections to apply. The triangulation allows rapid identification of which 3 snapshots enclose the current parameter values.

Then the correction values at each of these 3 points are interpolated using some scheme such as barycentric, but potentially higher order scheme as long as any precomputation of interpolants results only in values storable at those three joint (parameter) space points. BaryCentric interpolation performs a Delauney tetrahedralization of the observations, determines in which tetrahedron a grid point lies, and applies barycentric weights to the data values at each vertex of the tetrahedron. The barycentric weights essentially perform trilinear interpolation within the tetrahedron. For example, storing gradient data at each vertex would enable interpolations of higher-orders and possibly higher levels of continuity with no increase in the number of joint-space points required. For 3-dimensional joint parameterizations, a voronoi tetrahedralization is performed resulting in 4 corrections to be blended before addition to the base skinned model.

An interpolation scheme could use two joint parameters such as two angles at shoulder theta, and phi. Thereafter all key poses in theta, phi space can be triangulated using Delaunay triangulation. Then at runtime, the angles theta and phi are searched to determine which triangle is relevant. This determines which sets of correction vertex buffers to set into vertex stream. The barycentric or radial basis weights for those 3 sets of correction data can be generated and set as shader constants for interpolating correction streams.

In an alternative embodiment the perturbations can be stored on the model at points computed by tessellation of a lower-resolution base mesh, or at those computed by a texturing operation. In this case the re-application of these interpolated corrections would use standard displacement mapping.

Tessellation Based Rendering

The base mesh is stored at a reduced resolution being the control vertices of higher order primitives that will be tessellated in hardware. The corrections at each snapshot correspond directly to the points that will be generated by the hardware tessellator.

For each such point generated, the corresponding correction factor is computed by interpolation of the higher-order primitive.

Bump or Displacement Map-Based Rendering.

The model is textured i.e. has a 2-D surface parameterization applied to it stored as u-v coordinates. This parameterization can be used to map color values via texturing, lighting values via bump mapping, or height values via displacement mapping. In this case, the correction values stored at each snapshot pose can be stored as maps using this per-texel parameterization. Then they can be used as either displacement maps (or bump maps if the distance of the character is far enough). The displacement maps (or bump maps) are interpolated from the adjacent snapshots, and can be applied using conventional displacement mapping (or bump mapping) techniques.

Figure 7:
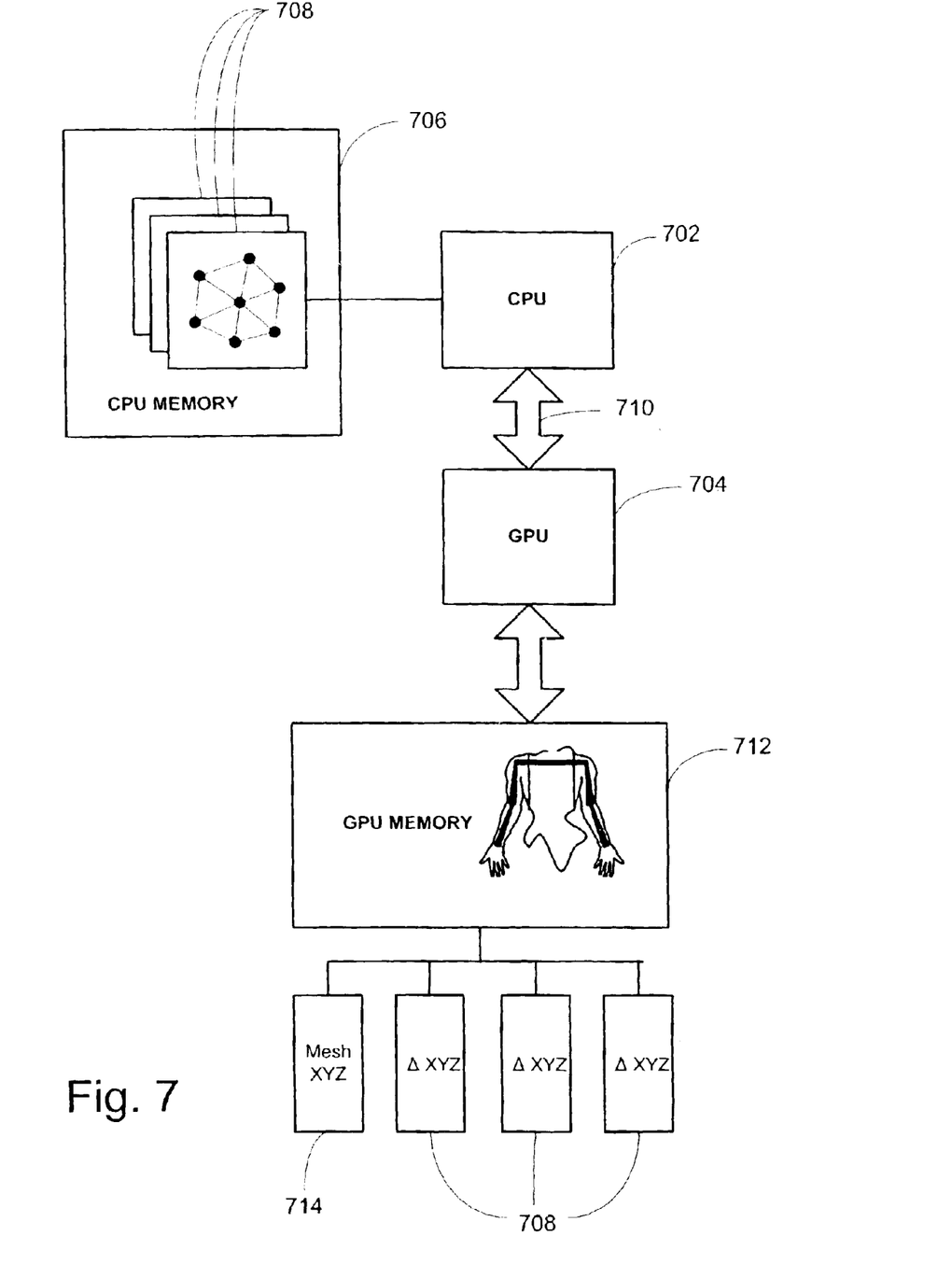
FIG. 7 is a block diagram of a CPU and a GPU in communication to perform the processes described in connection with an embodiment of the invention.

FIG. 7 further illustrates how the process operates on a CPU 702 in conjunction with a GPU 704. CPU 702 performs certain of the task associated with the graphics generation techniques described herein. For example, the search for the joint parameters can be performed by searching the CPU memory 706 for the closest predefined joints corrections 708 to a selected (e.g., mathematically generated) joint angle (e.g., using a Vornoi search). After finding the closest set of joint corrections 708, the selected joint corrections are passed from CPU 702 to GPU 704 over graphics bus 710 along with the base mesh. Because only selected correction data is passed over graphics bus 710, bus 710 does not become a bottleneck. GPU 704 then performs the blending of a base mesh 714 with the selected joint corrections 708 that are stored in GPU memory 712.

The actual blending of the corrections for each joint area can also be done on the host CPU 702 as well as the reduction in information required by this phase is beneficial there also.

Also, the update of the corrections can be performed at a separate temporal resolution. For example: If the joint positions at consecutive frames do not differ much, then only the base skinned mesh need be recomputed, and the same corrections as last frame are applied.

The run-time process may be summarized according to the following steps:

1. Run animation system to extract desired joint parameters for all joints.
2. Perform skinning using selected base skinning technique.
3. Identify nearest snapshot poses and corresponding corrections.
4. Interpolate corrections from snapshot poses to current pose
5. Add these corrections to parameters to base skinning results.
6. Render the shape.

The base skinned mesh provides the basis to start from. This enables correction factors to be stored as packed 8-bit vectors. The base mesh should preferably have very blurry distribution of skin weights so that all joints will usually be smooth so that correction factors can be clearly parameterized. In this case, the authoring process would take skinned character and move it into a desired pose. The vertices would be moved around to provide desired muscle bulges, etc. Snapshots of the key pose corrections would be saved. The tool preferably would subtract current vertex positions from "originals due purely to skinning" and saves positions and normals as 8-bit packed quantities.

As mentioned above, while exemplary embodiments of the present invention have been described in connection with various computing devices and network architectures, the underlying concepts may be applied to any computing device or system in which it is desirable to perform computer animation of characters. Thus, the techniques of performing the character skinning may be applied to a variety of applications and devices. For instance, the techniques of the invention may be applied to computer games, movie animations, etc. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the managing techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the resource management capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software. While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A method for generating a computer graphic of a shape to be animated, said shape having at least one joint wherein the shape changes about the joint, comprising:

providing a mesh comprising at least three points, each point defined in three-dimensional space, said mesh indicative of the shape in a base position;

providing information indicative of the position of the points in the mesh corresponding to the shape at predefined positions wherein the shape has changed about the joint with respect to the base position;

generating the position of the at least three points as an interpolation between the information indicative of the position of the points in the mesh corresponding to the shape at least two selected positions from the predefined positions;

wherein the at least two positions are identified as the closest positions in parameter space to a desired position.

2. The method as recited in claim 1 wherein the selected number of positions in parameter space is at least equal to the number of degrees of freedom about the joint plus one.

3. The method as recited in claim 1 wherein the selected positions are selected by way of a spatial search.

4. The method as recited in claim 1 wherein generated position of the at least three points are rendered as a two-dimensional representation of three-dimensional space.

5. The method as recited in claim 4 wherein the selection is performed by a central processing unit and the rendering is performed by a graphics processor unit.

6. The method as recited in claim 4, wherein said rendering is performed at run time.

7. The method as recited in claim 1 wherein the shape is representative of a character having an outer skin.

8. The method as recited in claim 7 wherein the joint is representative of a character having segments that move with respect to one another.

9. The method as recited in claim 8 wherein the joint is representative of bone segments that move about the joint.

10. The method as recited in claim 1 wherein the information indicative of the position comprises offsets to the mesh points from the base position.

11. The method as recited in claim 1 comprising computing the offset by subtracting vertices in the predefined positions.

12. The method as recited in claim 1 wherein the predefined positions are determined by an authoring tool wherein the shape is posed.

13. The method as recited 12, wherein software application is a game application.

14. The method as recited in claim 1, wherein said selecting is performed by a software application.

15. The method as recited in claim 1, wherein said generating is performed at run time.

16. A computer-readable medium bearing computer-readable instructions for carrying out the acts recited in claim 1.

17. A method of rendering a computer generated shape, comprising:
providing a mesh comprising at least three points, each point defined in three-dimensional space, said mesh indicative of the shape in a base position;
providing information indicative of the position of the points in the mesh corresponding to the shape at predefined positions wherein the shape has changed about the joint with respect to the base position;
approximating the shape associated with a new position based upon a movement about a joint parameter;
generating a correction to the approximation of the shape associated with the new position by interpolating between the information indicative of the position of the points in the mesh corresponding to the shape at at least two selected positions from the predefined positions;
wherein the at least two positions are identified as the closest positions in parameter space to a desired position;
correcting the shape associated with the new position; and
rendering the shape associated with the new position.

18. The method as recited in claim 17 wherein the generation of the correction to the approximation is generated as a blend of the at least two selected positions based upon the position of the approximation relative to the at least two selected positions.

19. The method as recited in claim 18 wherein the frame is approximately representative of bone segments that move about the joint portion.

20. The method as recited in claim 17 wherein the approximation of the shape associated with the new position is determined by calculating the position of a first portion of the shape relative to a first frame portion and calculating the position of a second portion of the shape relative to a second frame portion; and calculating the shape about the joint parameters as a blend between the first portion of the shape and the second portion of the shape.

21. The method as recited in claim 20 wherein the blend is a function of the relative association of a portion of a joint portion with a first portion or a second portion.

22. The method as recited in claim 21 wherein the number of functions is dependent upon the number of degrees of virtual movement about the joint portion.

23. The method as recited in claim 17 wherein the selected number of positions is at least equal to the number of virtual degrees of freedom about the joint portion plus one.

24. The method as recited in claim 17 wherein the selected positions are selected by way of a spatial search.

25. The method as recited in claim 17 wherein generated position of the at least three points are rendered as a two-dimensional representation of three-dimensional space.

26. The method as recited in claim 17 wherein the selection is performed by a central processing unit and the rendering is performed by a graphics processor unit.

27. The method as recited in claim 17 wherein the shape is representative of a character having an outer skin and wherein the mesh represents points on triangular vertices representing surface areas on the outer skin.

28. The method as recited in claim 17 wherein the joint portion is representative of a character having segments that move with respect to one another.

29. The method as recited in claim 17 wherein the information indicative of the position comprises offsets to the mesh points from the base position.

30. The method as recited in claim 29 comprising computing the offset by subtracting vertices in the predefined positions.

31. The method as recited in claim 17 wherein the predefined positions are determined by an authoring tool wherein the shape is posed.

32. The method as recited in claim 17, wherein said selecting is performed by a software application.

33. The method as recited 32, wherein software application is a game application.

34. The method as recited in claim 17, wherein said generating is performed at run time.

35. The method as recited in claim 17, wherein said rendering is performed at run time.

36. A system for rendering a computer generated shape, comprising:
a memory device for storing a mesh comprising at least three points, each point defined in three-dimensional space, said mesh indicative of the shape in a base position;
a memory device for storing information indicative of the position of the points in the mesh corresponding to the shape at predefined positions wherein the shape has changed about the joint with respect to the base position;
a processor device for approximating the shape associated with a new position based upon a movement about a joint parameter;
a processor device for generating a correction to the approximation of the shape associated with the new position by interpolating between the information indicative of the position of the points in the mesh corresponding to the shape at at least two selected positions from the predefined positions;
wherein the at least two positions are identified as the closest positions in parameter space to a desired position;
a processor device for correcting the shape associated with the new position; and
a processor device for rendering the shape associated with the new position.

37. The system as recited in claim 36 wherein the generation of the correction to the approximation is generated as a blend of the at least two selected positions based upon the position of the approximation relative to the at least two selected positions.

38. The system as recited in claim 36 wherein the approximation of the shape associated with the new position is determined by calculating the position of a first portion of the shape relative to a first frame portion and calculating the position of a second portion of the shape relative to a second frame portion; and calculating the shape about the joint parameters as a blend between the first portion of the shape and the second portion of the shape.

39. The system as recited in claim 38 wherein the blend is a function of the relative association of a portion of a joint portion with a first portion or a second portion.

40. The system as recited in claim 39 wherein the number of functions is dependent upon the number of degrees of virtual movement about the joint portion.

41. The system as recited in claim 38 wherein the frame is approximately representative of bone segments that move about the joint portion.

42. The system as recited in claim 36 wherein the selected number of positions is at least equal to the number of virtual degrees of freedom about the joint portion plus one.

43. The system as recited in claim 36 wherein the selected positions are selected by way of a spatial search.

44. The system as recited in claim 36 wherein generated position of the at least three points are rendered as a two-dimensional representation of three-dimensional space.

45. The system as recited in claim 36 wherein the selection is performed by a central processing unit and the rendering is performed by a graphics processor unit.

46. The system as recited in claim 36 wherein the shape is representative of a character having an outer skin and wherein the mesh represents points on triangular vertices representing surface areas on the outer skin.

47. The system as recited in claim 36 wherein the joint portion is representative of a character having segments that move with respect to one another.

48. The system as recited in claim 36 wherein the information indicative of the position comprises offsets to the mesh points from the base position.

49. The system as recited in claim 38 comprising computing the offset by subtracting vertices in the predefined positions.

50. The system as recited in claim 36 wherein the predefined positions are determined by an authoring tool wherein the shape is posed.

51. The system as recited in claim 36, wherein said generating is performed at run time.

52. The system as recited in claim 36, wherein said rendering is performed at run time.

53. The system as recited in claim 36, wherein the processor device for approximating, the processor device for generating, the processor device for correcting, and the processor device for rendering comprise at least one central processing unit.

54. A computer-readable medium bearing computer readable instructions for carrying out the steps of:

providing a mesh comprising at least three points, each point defined in three-dimensional space, said mesh indicative of the shape in a base position;

providing information indicative of the position of the points in the mesh corresponding to the shape at predefined positions wherein the shape has changed about the joint with respect to the base position;

approximating the shape associated with a new position based upon a movement about a joint parameter;

generating a correction to the approximation of the shape associated with the new position by interpolating between the information indicative of the position of the points in the mesh corresponding to the shape at at least two selected positions from the predefined positions;

wherein the at least two positions are identified as the closest positions in parameter space to a desired position;

correcting the shape associated with the new position; and rendering the shape associated with the new position.

55. The computer-readable medium as recited in claim 54 wherein the generation of the correction to the approximation is generated as a blend of the at least two selected positions based upon the position of the approximation relative to the at least two selected positions.

56. The computer-readable medium as recited in claim 55 wherein the approximation of the shape associated with the new position is determined by calculating the position of a first portion of the shape relative to a first frame portion and calculating the position of a second portion of the shape relative to a second frame portion; and calculating the shape about the joint parameters as a blend between the first portion of the shape and the second portion of the shape.

57. The computer-readable medium as recited in claim 56 wherein the blend is a function of the relative association of a portion of a joint portion with a first portion or a second portion.

58. The computer-readable medium as recited in claim 57 wherein the number of functions is dependent upon the number of degrees of virtual movement about the joint portion.

59. The computer-readable medium as recited in claim 54 wherein the selected number of positions is at least equal to the number of virtual degrees of freedom about the joint portion plus one.

60. The computer-readable medium as recited in claim 54 wherein the selected positions are selected by way of a spatial search.

* * * * *